United States Patent
Tone

[11] 3,888,083
[45] June 10, 1975

[54] VARIABLE SPEED DUAL HYDROSTATIC DRIVE

[76] Inventor: John W. Tone, 2601 Foulke Rd., Wilmington, Del. 19810

[22] Filed: June 19, 1974

[21] Appl. No.: 480,744

Related U.S. Application Data

[62] Division of Ser. No. 308,567, Nov. 21, 1972, Pat. No. 3,826,097.

[52] U.S. Cl. .............. 60/431; 60/486; 60/487; 60/491; 180/6.48; 114/150
[51] Int. Cl. ............... F15b 11/16; F16h 39/46
[58] Field of Search ...... 114/150; 60/421, 423, 486, 60/431, 487, 490, 491, 492; 180/6.3, 6.48

[56] References Cited
UNITED STATES PATENTS

| | | | |
|---|---|---|---|
| 1,981,805 | 11/1934 | Kacer et al. ......................... | 74/856 |
| 2,774,434 | 12/1956 | Ferris ............................ | 180/6.48 X |
| 3,114,424 | 12/1963 | Voreaux ............................ | 180/6.3 |
| 3,234,856 | 2/1966 | Martin ............................ | 180/6.48 X |
| 3,500,633 | 3/1970 | Livezey ............................ | 60/492 X |

*Primary Examiner*—Edgar W. Geoghegan
*Attorney, Agent, or Firm*—Mortenson & Weigel

[57] ABSTRACT

A dual hydrostatic drive is operated to provide the required demand horsepower of a particular ship and speed condition while maximizing the loading of the input prime mover. The dual drive for the ship is controlled by either a flow divider or by dual sliding cams. This extends the useful life and reduces the fuel consumption of the prime mover. The overall efficiency of the drive system is improved.

8 Claims, 6 Drawing Figures

PATENTED JUN 10 1975   3,888,083
SHEET 1

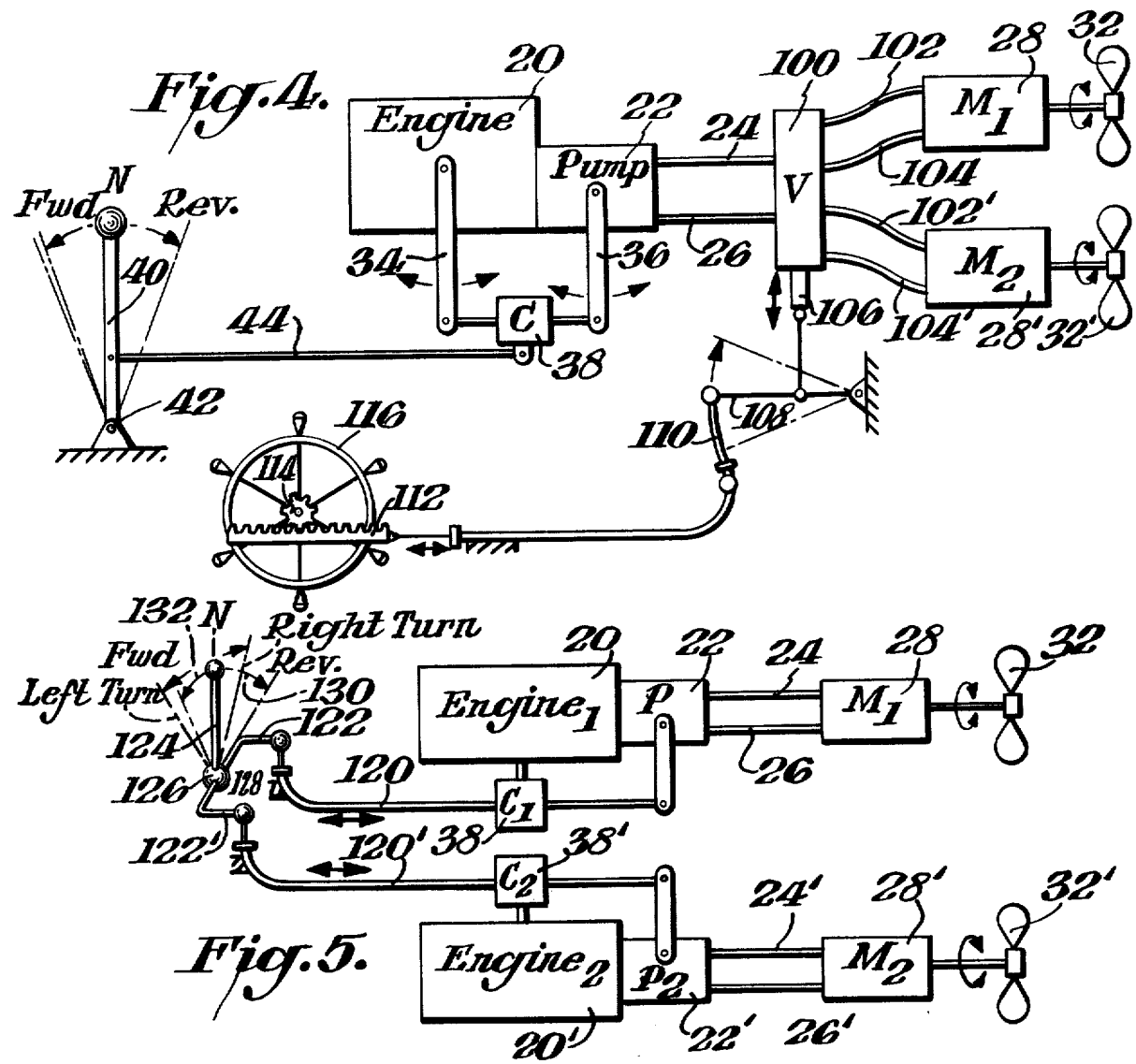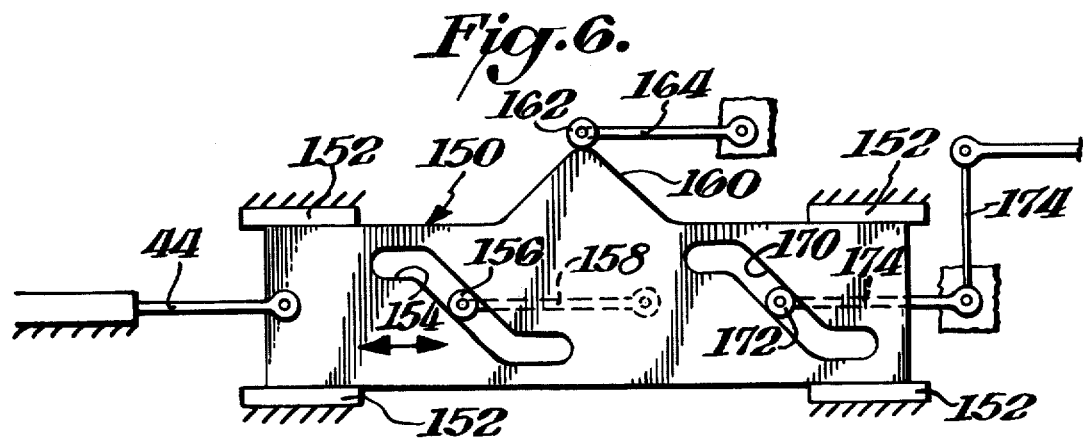

VARIABLE SPEED DUAL HYDROSTATIC DRIVE

This is a division of U.S. patent application Ser. No. 308,567 filed Nov. 21, 1972 now U.S. Pat. No. 3,826,097 granted July 30, 1974 entitled "Variable Speed Hydrostatic Drive" by John W. Tone.

BACKGROUND OF THE INVENTION

This invention relates to a variable speed hydrostatic drive that increases the loading on an input prime mover while meeting the required demand horsepower of a load and yet is relatively simple in construction.

There are many drive systems known which have a conventional direct drive, mechanical or otherwise, operating with a fixed reduction ratio. The term "reduction ratio" means the power output shaft driving the load operates at a lower angular velocity than does the prime mover and the relationship between these velocities is fixed.

In a typical case, the load to be driven has a demand horsepower requirement which varies as a function of the speed with which the load is to be driven. This load may be a locomotive, a marine or other vehicle, or a machine drive. At the same time, the prime mover for the system develops a certain horsepower which varies as a function of the angular velocity of the prime mover output shaft. Unfortunately, since these two relationships are not represented by the same function. Often the prime mover must overspeed and consume excess fuel to satisfy the required angular velocity requirements of the load. This results in excessive fuel consumption due to the frictional and compression pumping losses in the engine and increased wear and fatigue of parts operating at higher speeds.

More recently, various automatic systems have been developed for optimizing the efficiency of the engine and transmission. Unfortunately, many of these systems are relatively complicated, costly, and tend to become unreliable due to their very complexity.

It is, therefore, an object of this invention to obviate the many disadvantages of the prior art drive systems.

Another object of this invention is to provide an improved variable speed dual hydrostatic drive that is relatively simple and yet provides a variable reduction ratio throughout the operating range of the system.

Another object of this invention is to provide a variable speed dual hydrostatic drive system which supplies only enough power to the load throughout the speed range of the load to satisfy the performance required or demanded.

BRIEF DESCRIPTION OF THE INVENTION

In a preferred embodiment of the invention, a hydrostatic drive system for a load having a known power demand versus speed characteristic includes a first and second prime mover each having first adjustable control means for varying the speed of a respective one of said prime movers, first and second reversible and adjustable fluid pumps adapted to be driven by corresponding ones of said prime movers, each having second adjustable control means for varying the fluid displacement of a respective one of said pumps, first and second hydraulic motors hydraulically connected to a different one of said pumps and adapted to drive said ship at speeds related to the speeds of said motors, first master control means connected to said first prime mover control means and said first pump second control means for adjusting the speed of said first prime mover and the displacement of said first pump, first manual means for setting said first master control means for a desired ship speed, second master control means connected to said second prime mover control means and to said second pump second control means for adjusting the speed of said second prime mover and the displacement of said second pump and a second manual means for setting said second master control means for a desired ship speed, said first and second master control means operating to adjust the speeds of said first and second prime movers to the minimum required to meet the power demand of said ship at said desired speed, whereby said ship may be steered by manipulation of said first and second manual means.

In another embodiment, a ship is provided with a pair of horizontally spaced propellers and a drive system for the propellers includes a prime mover having a first adjustable control means, a first reversible and adjustable fluid pump adapted to be driven by said prime mover and having a second adjustable control means for varying the fluid displacement of said pump, a first hydraulic motor hydraulically coupled to said pump and adapted to drive one of said drive members and hence said ship at speeds related to the speed of said motor, first master control means connected to said first and second control means for relatively adjusting the speed of said prime mover and the displacement of said pump, a manual means for setting said first master control means, a second hydraulic motor hydraulically coupled to said pump and a controlled flow divider means.

The first master control means in a preferred embodiment includes first and second cam means having corresponding first and second cam surfaces and first and second cam followers respectively coupled to the first and second control means. The first and second cam followers are associated respectively with the first and second cam surfaces, thereby to permit the simultaneous adjustment of the first and second control means in accordance with the setting of the manual means for matching the prime mover horsepower to the demand horsepower of the load for all desired speeds in both forward and reverse directions.

In other embodiments of the invention, two hydraulic motors are driven by the same pump. A slide valve arrangement controls the fluid flow to the two motors such that by placing the motors side by side in a boat, for example, and varying the fluid directed to each motor, the boat may be steered without the use of a rudder. This appreciably reduces the drag losses of the rudder and steering assemblages.

BRIEF DESCRIPTION OF THE DRAWINGS

The novel features that are considered characteristic of this invention are set forth with particularly in the appended claims. The invention, itself, however, both as to its organization and method of operation, as well as additional objects and advantages thereof, will be best understood from the following description when read in connection with the accompanying drawings, in which:

FIG. 4 is a block diagram of a ship hydrostatic drive system in which two hydraulic motors are employed to effect ship steering as well as propulsion, with a single prime mover and a single variable displacement pump;

FIG. 5 is a block diagram partly in pictorial representation of a variable speed hydrostatic drive system for a ship utilizing two prime movers and twin propellers for effecting ship steering in which a single control lever is utilized to control both ship speed and direction;

FIG. 6 is an elevation view of a slide cam arrangement adapted to control engine speed, pump displacement and motor displacement simultaneously in order to match the ship demand horsepower to the engine horsepower while maintaining minimum engine speed.

DETAILED DESCRIPTION OF THE PREFERRED EMBODIMENTS

Figure 1:
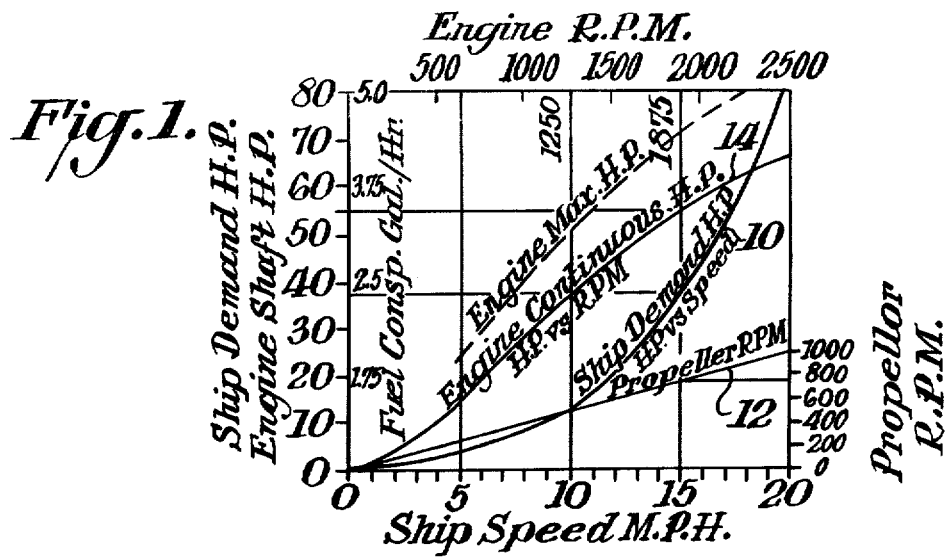
FIG. 1 is a combination plot of the ship demand horsepoer, engine shaft horsepower, and propeller speed against ship speed and engine speed depicting the various relationships such as demand horsepower versus ship speed, engine horsepower versus engine r.p.m. and propeller speed versus ship speed for a particular internal combustion engine and a particular ship.

There is seen in FIG. 1 the various curves depicting the relationship between a typical prime mover or internal combustion engine horsepower plotted in curve 14, as a function of engine angular velocity and the ship demand horsepower depicted by curve 10 plotted as a function of ship speed. In addition, the ship performance relation, i.e., propeller speed versus ship speed relationship is plotted as curve 12. From these curves 10, 12, 14 it may be seen that with a conventional direct drive or a drive having a fixed reduction ratio, the engine must overspeed and consume excessive fuel in order to satisfy the required propeller angular or rotational velocity throughout the ship's performance range. It may be noted from these curves that propeller speed increases almost linearly in proportion to the ship speed except for small changes in efficiency of the propeller throughout its speed range. It may be seen also that in the low range of a ship's speed, such as 5 miles per hour (m.p.h.), the propeller angular velocity or speed needed to drive the ship is 240 revolutions per minute at the minimum engine speed of 600 rpm, which is the engine idle speed. Further, at the maximum speed that the propeller must turn, which in this instance is 1000 rpm, the engine speed is 2500 rpm, therefor indicating a reduction ratio of 240/600 = 1/2.5 at low speeds and 1000/2500 = 1/2.5 at maximum speed. With these fixed reduction ratios of 1 to 2.5 which is typical of a conventional drive, it is seen that for every revolution of the propeller, the engine turns 2 ½ revolutions.

To illustrate the losses that occur in a direct drive system of this type with no variation of the ratio throughout the speed range, two typical speeds may be examined to determine the fuel consumption. Thus, if a ship speed of 15 m.p.h. is selected, according to FIG. 1 a propeller speed of 750 rpm would be required. Similarly, with the reduction ratio of 1/2.5 the engine must run at 1875 rpm. At this speed the engine can develop a horsepower of 55. However, the ship only requires 37.5 horsepower to reach this speed as seen from curve 10.

If on the other hand an appropriate variable speed transmission were used, at 15 m.p.h. the demand horsepower of 37.5 horsepower can be generated by the engine at 1250 rpm as may be seen from the engine horsepower curve 14. Since the required propeller speed is only 750 rpm as determined previously, it would be desirable to use a reduction ratio of 750/1875 = 1/1.66.

It is a well established fact that the specific fuel consumption, i.e., gallons or pounds per horsepower per hour is substantially reduced when an internal combustion engine is run in a loaded condition, i.e., absorbs its rated horsepower at a given rpm as compared to the low percentage loading as shown in FIG. 1, i.e., 33 percent at 5 m.p.h. and 70 percent at 15 m.p.h. The savings in fuel consumed vary with the degree of loading, but are in the order of 11 percent for a four cycle engine and 20 percent for a two cycle engine in the example described.

A ship typically cruises at 80 percent of its maximum speed to extend the engine life. In the example illustrated in FIG. 1 a cruising speed of 0.8 × 20 m.p.h. = 16 m.p.h., with a conventional fixed reduction gear drive, the engine speed equals 2000 rpm. With the variable drive the engine speed is only 1450 rpm, which is very close to the maximum torque point of the engine described. At the maximum torque point, the best efficiency possible is obtained from the engine (lowest specific fuel consumption).

The life of the engine is greatly increased at these lower rpm's since there is a modest increase in the b.m.e.p. (brake mean effective pressure) but the inertia forces, which vary as the square of the speed, are almost reduced to 50 percent and the pumping (compression and exhaust) work and friction losses are reduced. The life of the engine is greatly increased.

It is thus apparent that for any ship or other load, for that matter, that has a known engine horsepower versus rpm relationship and a known propeller pitch (advance per revolution), an appropriate reduction ratio versus ship speed relation can be plotted. If one also knows the relationship of the position of the control lever, which controls the throttle of an otto cycle motor or the injection pump of a diesel motor, for example, to engine horsepower, the engine speed and pump displacement may be varied according to the desired speed of the ship to achieve maximum efficiency between the engine and the ship propeller throughout the speed range of the ship.

Figure 2:
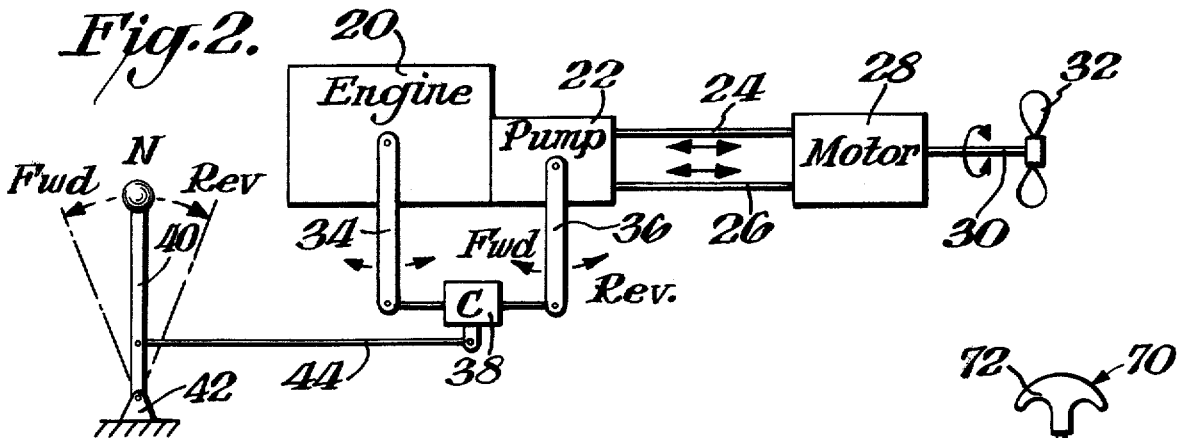
FIG. 2 is a block diagram depicting a marine hydrostatic drive system constructed in accordance with this invention utilizing a control mechanism for matching the engine horsepower to the demand horsepower of the ship throughout the ship's speed range.
Figure 3:
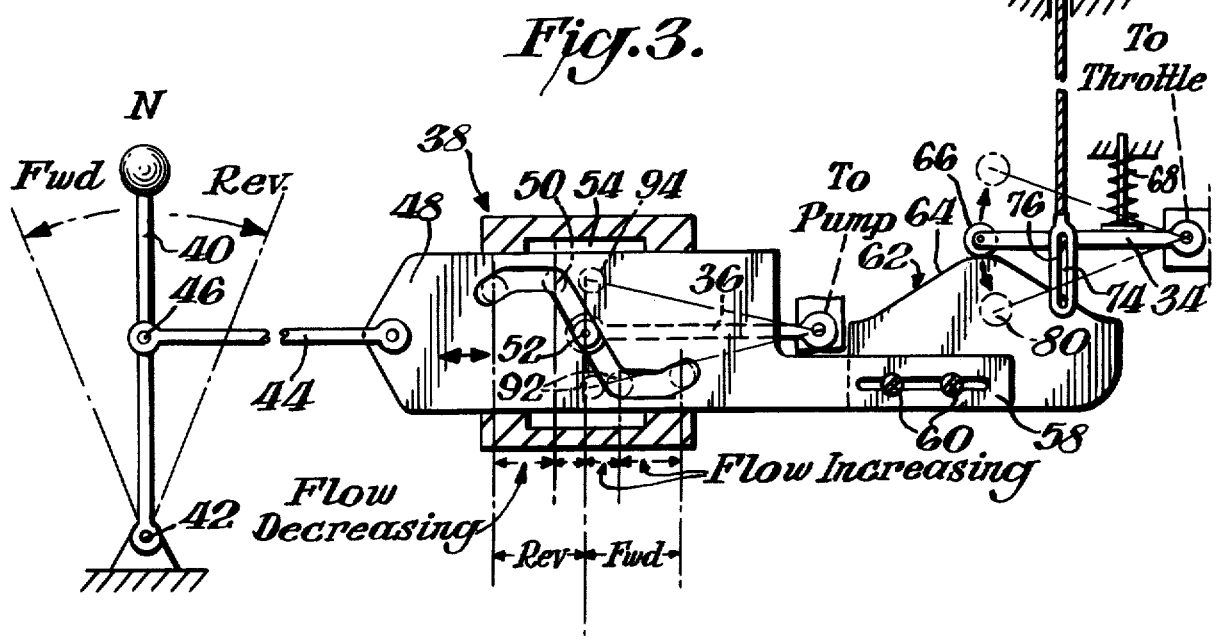
FIG. 3 is an elevation view of a slide cam arrangement which may be used to implement the control mechanism illustrated in FIG. 2.

Once such system for accomplishing this is illustrated in FIGS. 2 and 3. Thus, in FIG. 2 there is seen a prime mover 20 which is connected to drive the shaft of a reversible and adjustable hydraulic pump 22. In turn the pump 22 is connected through fluid conduits 24 and 26 to a reversible fixed displacement hydraulic motor 28. The hydraulic fluid from the pump 22 circulates through one or other of the lines 24–26 to drive the motor 28 in either a clockwise or counterclockwise direction as is well known in the art. In turn the output of the motor 28 is connected through a shaft 30 to drive a propeller 32 which, when mounted in a suitable boat or ship hull, may provide the necessary propulsion power for the ship.

The prime mover 20 may be a conventional internal combustion motor such as a diesel engine or conventional gasoline driven engine. In any event, the prime mover 20 has an adjustable control means 34 which controls the amount of the fuel supplied to the engine. This control means 34 in the case of a diesel engine may be the control rod monitoring the injection pump. In the case of the gasoline engine, it may be the throttle which controls the flow of gas through the carburetion system.

In like manner, the pump 22 may be any conventional variable displacement hydraulic pump as a piston pump of well known type. In any event, the pump 22 has an adjustable control arm 36 for varying the displacement of the pump and hence the volume of fluid flow through the pump and also the direction of the fluid flow through the pump. Both the prime mover control means 34 and the pump control arm 36 are connected to a master control mechanism 38 which operates under the impetus of a hand or manual control depicted by the lever 40 pivoted about the fixed point 42 and operating through the linkage 44 to operate the master control means 38. The master control means 38 in turn varies the respective control links 34 and 36 as a function of the necessary ship demand and prime mover horsepower versus rpm and propeller relationships, respectively, in accordance with this invention, to operate the prime mover at the minimum speed that will develop the horsepower required to move the ship at this desired speed. Stated another way, the master control means 38 matches the engine power to the demand horsepower of the ship throughout the ship speed range.

The details of a preferred control mechanism 38 are illustrated in FIG. 3. This control mechanism functions to allow the pump control arm 36 to pass through neutral (zero output) coincident with an engine throttle idle position. The function is required for both starting the engine without load and also to permit the engine to pass through this phase when reversing. This is necessary to prevent stalling the engine. The mechanism illustrated in FIG. 3 is a slide cam mechanism in which the manual control arm 40 is pivoted at a fixed pivot point 42 and operates through a pivoted linkage 44 connected to the mid-point 46 of the manual control 40 to a slide cam 48 in the form of a plate having a curved slot or cam 50 formed therein. The slot 50 provides a cam surface against which a cam follower 52 may move as the cam 48 is slid back and forth (left to right in the drawing) within a pair of guide blocks 54. The cam surface 50 is noted as being somewhat Z-shaped with the cam followers 52 being depicted in neutral position. The cam follower is connected to the lever 36 which is connected to the control arm 36 of the pump.

Attached to a projecting slotted tab 58 on the end of the slide cam 48 there is secured, as by adjusting screws 60, a throttle control cam plate 62. The upper surface of the throttle control cam plate 62 includes the cam 64 which, operating through a cam follower 66, controls the prime mover or engine speed. The cam follower 66 is attached to the end of the throttle control linkage 34 which is urged downwardly against the cam surface 64 by means of a suitable spring 68. A manual pull-to-stop control 70 is also illustrated. This pull-to-stop control has a handle 72 which is secured through a shaft to a pivoted slot assembly 74 at the lower end thereof (in the drawing). The slot 74 engages a pin 76 attached to the side of the engine throttle control arm 34 such that by lifting the handle 72 the control arm 34 is raised up to cut the engine below its idle speed. The slot 74 is of sufficient length to permit the cam follower 66 to follow the cam surface 64 during operation of the slide cam.

The throttle control arm 34, in the position illustrated, is in the engine idle position. As the follower 66 drops (in the drawing) or rotates in a counterclockwise direction, the engine speed is increased to a maximum as depicted by the phantom position of the follower 80. In like manner, the position illustrated for the pump control arm 36 is in neutral position, i.e., no fluid flow. As the follower 52 drops (in the drawing) such as to the lowermost position illustrated by the phantom lines 92, the fluid flow from the pump increases and is in such a direction as to drive the motor in a forward direction at full pump displacement and decreased reduction ratio of the hydraulic transmission. Conversely, as the follower moves upwardly, to the position depicted in phantom at 94, the pump is operated in a full reversed flow sense and the reduction ratio of the hydraulic transmission is reduced.

Thus, in an assumed operation, the operator moves the manual control arm 40 in a forward direction from the neutral position N, thereby moving the slide cam plate to the left in the drawing. The pump control arm 36 increases the fluid flow into the fluid motor in a forward sense from zero. As the manual control 40 continues to move to the left in the drawing so as to increase forward speed, the volume of fluid flow is increased until a maximum is achieved after which, due to the Z-shape of the cam surface 50, the flow is again decreased thereby increasing the reduction ratio of the transmission in order to match ship power to the propeller rpm.

This same movement of the manual control lever 40 from the neutral or idle position also causes the throttle cam 66 to move downwardly in the drawing allowing the engine speed to be increased, slowly at first and then at an increasing rate. The same control function prevails regardless of whether the manual lever is moved for forward or reverse speed. With this arrangement, it may be seen that the ship demand horsepower is matched to the engine horsepower and yet the engine is operated at minimum rpm in all cases.

Referring to FIG. 1, it is seen that at low ship speeds the ship demand horsepower increases relatively slowly with increased ship speed. Conversely, the engine developed horsepower increases rather quickly with increased ship speed. This accounts for the different slopes of the cam surfaces 64 and 50 for the engine and motor respectively. These varying functions result in a varying reduction ratio. A similar analysis may be made for the reverse direction, however, this is not believed necessary to the understanding of this invention. Virtually any control function can be achieved by proper shaping of the cam surfaces.

In accordance with this invention a system utilizing dual drive motors which permits a ship to be steered by the drive system without aid of a rudder is illustrated in the drawing of FIG. 4. In this illustration the system incorporates the same elements as those shown in FIG. 2 up through the pump 22. From this point on, the fluid lines 24 and 26 are connected to a dividing valve which can be a poppet or sliding spool valve 100. Alternatively, a cam actuated poppet valve may be used. Whichever valve is used, it controls the equal or differential flow to two separate fixed displacement hydraulic motors 28 and 28'. Fluid lines 102-104 connect the fluid flow from the poppet valve 100 to the motor 28 wherein lines 102 and 104' connect the poppet valve to the second motor 28'. The motors in turn are connected to propellers 32 and 32' respectively. By adjustably controlling the fluid flow to these respective motors, steering of the ship may be accomplished by varying the load, i.e., the speed of the propellers 32 and 32'.

The sliding spool valve 100, which functions to divide the flow from the fluid lines 24 and 26 to the respective motors 28 and 28' is controlled by an actuating arm 106 which is operated by the linkage 108 which in turn is connected to be controlled by a cable 110 connected to rack and pinion gears 112 and 114 respectively. The pinion gear 114 is rotated by, for example, a ship's steering wheel 116. Thus rotation of the wheel 116 imparts lineal motion to the cable 110 which operates the linkage 108. This linkage is illustrated as a second class lever to reduce the motion imparted by the cable and thereby operate the actuating member 106 of the spool valve 100 to vary the fluid flow to the respective motors 28 and 28'. This increases or decreases the speed of the respective propellers 32 and 32' and effects steering of the ship as noted without varying the load, i.e., the speed of the prime mover 20.

Another alternative embodiment of this dual drive ship steering system is illustrated with reference to the block diagram of FIG. 5 in which there is illustrated a twin prime mover installation which includes two parallel engines 20 and 20', pumps 22 and 22', fluid lines 24–26 and 24'–26', fixed displacement motors 28 and 28' and propellers 32 and 32'. The motors and propellers are preferably positioned on a ship on widely separated propeller centers to enhance the ability to steer the ship without the aid of a rudder. As noted hereinbefore, this eliminates the rudder drag losses.

Master control means 38 and 38' are provided for the respective drive systems. Each control means 38 and 38' is controlled by respective push-pull cables 120 and 120' which in turn are connected between respective master controls 38 and 38' and the output control arms 122 and 122' of a differential control lever. A suitable control for this purpose is one manufactured by Morse Controls and is designated as Type 340X2. This control includes a central control lever 124 which is connected to a ball pivot 126. An output control arm 128 extends diametrically through the ball pivot 126 to operate the control arms 122 and 122'.

Thus, forward and reverse movement, as denoted by the arrows 130, of the control stick 124 causes the cables 120 and 120' to move back and forth equally. In like manner, sideways movement of the control stick designated by the arrows 132 cause the two cables 120 and 120' to move back and forth differentially with respect to each other to operate the master control means 38 and 38'. A combination of sideways and forward and reverse movement of the control stick produces a combination movement.

The remainder of the operation of the system is substantially the same as that previously described except for the fact that twin drive systems are employed. Thus, by varying the reduction ratio of the two drive systems, the ship may be maneuvered quite well at all speeds, turned, backed up, etc. Further, the demand horsepower of the load is met with minimal engine speed with the attendant advantages set forth hereinbefore.

Still another alternative embodiment of this invention is illustrated in FIG. 6 which allows a greater speed change range. In FIG. 6 there is shown an alternative master control means that may be employed in the event, for example, the motors 28 and 28' illustrated in FIG. 5 or any of the other figures, for that matter, are selected to be variable displacement motors so that they may be adjusted to operate at different speeds for the same fluid flow rate. In this event, the master control 38 may constitute a slide cam arrangement as illustrated in FIG. 6. In this arrangement, the control lever is linked as by 44 to the slide cam plate 150 which is adapted to slide within suitable bearings depicted at 152. The cam plate 150 has slots which define a pair of cam surfaces 154 and 170 in which cam followers 156 and 172, respectively, are positioned. The first cam follower 156 is connected by the linkage 158 to operate the hydraulic pump control lever 36 (FIG. 1). The second slot which forms the second cam surface 170, positions the motor control cam follower 172. This cam follower 172 is connected to the linkage 174 which is coupled to the adjustable displacement control lever of the hydraulic motor (not shown). In similar manner the upper portion (in the drawing) of the slide cam 150 is shaped to provide a cam surface 160 for control of the adjusting control lever of the prime mover. In this instance the cam follower 162 is coupled through a linkage 164 to operate the control lever 34 (FIG. 1) of the prime mover.

The particular configuration of the cam surfaces 154, 170 and 160 will depend of course upon the characteristics of the respective pumps, load, motor and the like. Certain of these characteristics are readily observable from an inspection of the drawing. For example, both the motor and pump must pass through the neutral position before going from forward to reverse. At this point, of course, the prime mover must be operating at idle speed. This is the condition illustrated in FIG. 6. In each instance, the cam configuration is such as to match the required load at minimum speed of the prime mover.

There has thus been described a relatively simple system by which the reduction ratio in the transmission comprising a hydraulic pump and motor is varied continuously through the speed range of a ship in order to provide the demand horsepower for the ship at the minimum engine speed. This result is obtained by the utilization of what preferably may be a slide cam arrangement with no requirement for relatively expensive, complex sensors and other servo controls. Alternatively, of course, a more sophisticated servo system may be substituted for the simple slide cams illustrated in order to obtain the desired control relationships described herein. With this invention considerable savings in fuel are achieved. A significant increase in ship maneuverability results. Wear and tear on the prime mover is reduced since it is always operated at minimum speed.

It is obvious that many embodiments may be made of this inventive concept, and that many modifications may be made in the embodiments hereinbefore described. Therefore, it is to be understood that all descriptive matter herein is to be interpreted as illustrative, exemplary and not in a limited sense.

What is claimed is:

1. A hydrostatic drive system for a ship having a known power demand versus speed characteristic comprising:

first and second prime movers each having first adjustable control means for varying the speed of a respective one of said prime movers, first and second reversible and adjustable fluid pumps adapted to be driven by corresponding ones of said prime movers, each having second adjustable control means for varying the fluid displacement of a respective one of said pumps, first and second hydraulic motors hydraulically connected to a different one of said pumps and adapted to drive said ship at speeds related to the speeds of said motors, first master control means connected to said first prime mover control means and said first pump second control means for adjusting the speed of said first prime mover and the displacement of said first pump, first manual means for setting said first master control means for a desired ship speed, second master control means connected to said second prime mover control means and to said second pump second control means for adjusting the speed of said second prime mover and the displacement of said second pump, and a second manual means for setting said second master control means for a desired ship speed, said first and second master control means operating to adjust the speeds of said first and second prime movers to the minimum required to meet the power demand of said ship at said desired speed, whereby said ship may be steered by manipulation of said first and second manual means.

2. A system according to claim 1 which also includes a joy-stick control lever and wherein said first and second manual means are connected to be simultaneously operated by said lever.

3. A system according to claim 1 wherein each of said master control means includes:
first and second cam means having corresponding first and second cam surfaces which are related to the continuous horsepower characteristic of said ship,
first and second cam followers each coupled to a respective one of said first and second control means, and
said first and second cam followers being associated respectively with said first and second cam surfaces, thereby to permit the simultaneous adjustment of said first and second control means in accordance with the setting of said manual means for matching the prime mover horsepower to the demand horsepower of said ship for all desired speeds.

4. A system according to claim 1 wherein said first and second hydraulic motors are each adjustable and reversible and said system includes a pair of third adjustable control means each for varying the fluid flow in a different one of said first motors, said first and second master control means each being connected to a different one of said third control means for adjusting the fluid flow in a corresponding one of said first motors, thereby to more closely optimize the operating characteristics of each of said prime movers, said pumps and said motors.

5. A hydrostatic drive system for a ship having a pair of horizontally spaced drive members comprising:
a prime mover having a first adjustable control means for varying the speed of said prime mover,
a first reversible and adjustable fluid pump adapted to be driven by said prime mover and having a second adjustable control means for varying the fluid displacement of said pump,
a first hydraulic motor hydraulically coupled to said pump and adapted to drive one of said drive members and hence said ship at speeds related to the speed of said motor,
first master control means connected to said first and second control means for relatively adjusting the speed of said prime mover and the displacement of said pump,
a manual means for setting said first master control means for a desired ship speed, said first master control means operating to adjust the speed of said prime mover to the minimum required to meet the power demand of said ship at a desired speed,
a second hydraulic motor hydraulically coupled to said pump to drive the other one of said drive members and hence said ship at speeds related to the speed of said motor, and
a controlled flow divider means connected between said pump and each of said motors for varying the fluid flow to each of said motors, thereby to steer said ship using said drive members.

6. A system according to claim 5 which also includes steering means coupled to said flow divider means for varying said fluid flow in accordance with the position of said steering means.

7. A system according to claim 6 wherein said first master control means includes:
first and second cam means having corresponding first and second cam surfaces,
first and second cam followere respectively coupled to said first and second control means,
said first and second cam followers being associated respectively with said first and second cam surfaces thereby to permit the simultaneous adjustment of said first and second control means in accordance with the setting of said manual means for matching the prime mover horsepower to the demand horsepower of said ship for all desired speeds.

8. A system according to claim 5 wherein said first hydraulic motor is adjustable and reversible and said system includes third adjustable control means for varying the fluid flow in said first motor, said master control means being also connected to said third control means for adjusting the fluid flow in said first motor, thereby to more closely optimize the operating characteristics of said prime mover, said pump and said motor.

* * * * *